United States Patent [19]

Kellner

[11] Patent Number: 4,616,949

[45] Date of Patent: Oct. 14, 1986

[54] STEERING KNUCKLE FOR A VELOCIPEDE

[76] Inventor: Andrew Kellner, 92 Cardigan Street, Stanmore, New South Wales, 2048, Australia

[21] Appl. No.: 654,160

[22] Filed: Sep. 25, 1984

[30] Foreign Application Priority Data

Dec. 13, 1983 [AU] Australia ............................. PG2825

[51] Int. Cl.⁴ .......................... F16B 7/10; F16B 11/00
[52] U.S. Cl. ................................... 403/104; 403/265; 403/344; 403/359; 403/373
[58] Field of Search .............. 403/344, 374, 373, 104, 403/359, 265; 74/551.3, 551.6

[56] References Cited

U.S. PATENT DOCUMENTS

| | | |
|---|---|---|
| 326,752 | 9/1885 | Latta . |
| 440,312 | 11/1890 | Kendall et al. . |
| 555,647 | 3/1896 | Latta . |
| 564,108 | 7/1896 | Rumbarger . |
| 603,671 | 5/1898 | Vanruyl . |
| 610,132 | 8/1898 | Goodridge ......................... 403/359 |
| 1,156,582 | 10/1915 | Biggar ................................. 403/374 |
| 1,616,021 | 2/1927 | Arzens . |
| 2,710,207 | 6/1955 | Mueller ............................... 403/373 |
| 2,838,329 | 6/1958 | Pressley ............................. 403/359 |
| 3,391,582 | 7/1968 | Polley, Jr. . |
| 3,923,218 | 12/1975 | Niemann ............................ 403/265 |
| 4,043,688 | 8/1977 | Humlong . |
| 4,322,087 | 3/1982 | Addicks . |

Primary Examiner—Cornelius J. Husar
Assistant Examiner—Peter M. Cuomo
Attorney, Agent, or Firm—Sandler & Greenblum

[57] ABSTRACT

A knuckle joint assembly to fix a handle bar to a steering shaft of a velocipede, the knuckle joint includes two knuckle parts between which the handle bar is clamped with a securing sleeve being fixed to the handle bar and engaging the knuckle parts to prevent rotation of the handle bar about its longitudinal axis relative to the knuckle parts.

7 Claims, 7 Drawing Figures

STEERING KNUCKLE FOR A VELOCIPEDE

The present invention relates to velocipedes and more particularly to the knuckle joint for the steering bar of velocipedes.

Conventionally the steering bar, usually termed "the handle bar" of bicycles has been secured to the steering shaft by means of a knuckle which includes a clamp with serrations which engages serrations on the steering bar. This has not been completely satisfactory since under high stress conditions the serrations shear with the result that the steering bar is allowed to rotate about its longitudinal axis. This problem has been exacerbated with the very popular use of bicycles in motocross conditions.

These bicycles, as particularly used by children, are often referred to as being "BMX" bicycles. In current use of BMX bicycles the rider and bicycle are subjected to considerable shock loading with the result that abnormal stress is being applied to the handle bars. This causes the serrations on the handle bars to shear thereby allowing the steering bar to rotate about its longitudinal axis. As a result of this movement of the steering bar the rider loses control of the bicycle and is often injured.

In U.S. Pat. Nos. 440,312; 564,108; 603,671; 326,752; 555,647; 4,043,688; 3,391,582; 1,616,021; and 4,322,087, there are disclosed numerous knuckle arrangements to fix a bicycle handle bar to the steering stem of the bicycle. These devices relying on frictional engagement which in some instances is enhanced by a knurled portion or a ratchet assembly engaging teeth formed on the handle bar itself. However, these devices are either unsafe for the reasons expressed in the above paragraph, or are too expensive to manufacture as the handle bar would need to be manufactured from thick gauge tubing.

It is the object of the present invention to overcome or substantially ameliorate the above disadvantages.

There is disclosed herein a knuckle joint assembly to fix a handle bar to a steering shaft of a velocipede, said assembly comprising a first knuckle part to be fixed to the steering shaft and having a recess, a second knuckle part also having a recess and to be fixed to the first knuckle part with the recesses of the knuckle parts cooperating to provide a passage through which the handle bar passes, one of said knuckle parts having a plurality of teeth projecting inwardly of said passage, a handle bar connection sleeve to surround said handle bar so as to be fixed thereto and to be sandwiched between said handle bar and knuckle parts, said sleeve having a plurality of outwardly projecting teeth to engage the teeth of the knuckle part, and clamp means fixing said knuckle parts together so that said handle bar and sleeve are clampingly fixed between said knuckle parts with the teeth of said sleeve and knuckle part engaged preventing rotation of said handle bar about its longitudinal axis relative to said knuckle parts.

A preferred form of the present invention will now be described by way of example with reference to the accompanying drawings, wherein.

Figure 1:
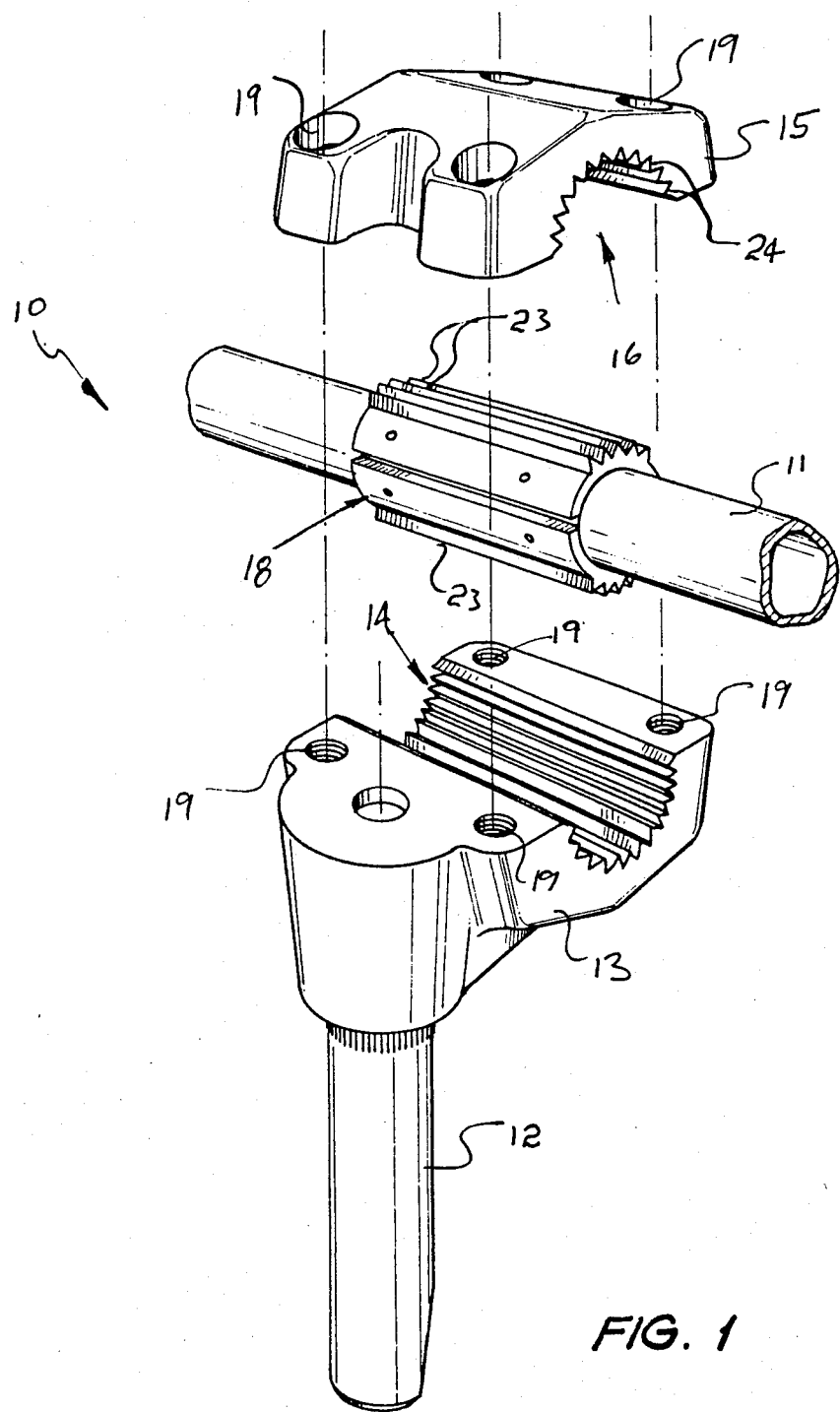
FIG. 1 is a schematic parts exploded perspective view of a knuckle joint assembly for the handle bar and steering shaft of a velocipede.
Figure 2:
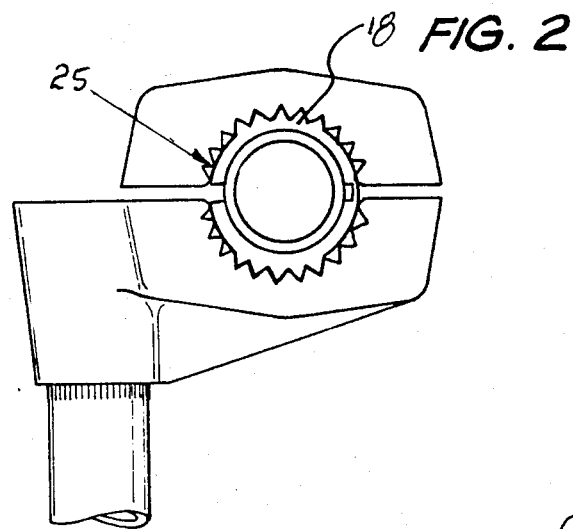
FIG. 2 is a schematic side elevation of the assembly of FIG. 1.
Figure 3:
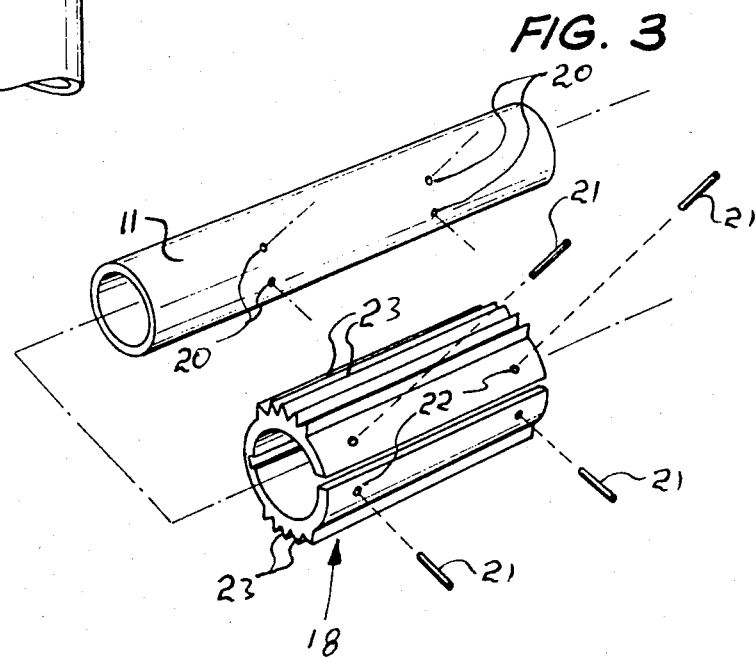
FIG. 3 is a schematic perspective view of a portion of the handle bar and a coupling sleeve employed in the assembly of FIG. 1.

In FIGS. 1, 2 and 3 there is schematically depicted a knuckle assembly 10 to secure the steering handle (handle bar) 11 of a velocipede to the steering shaft 12. The knuckle assembly 10 includes a first knuckle part 13 with a semi-circular recess 14. There is further provided a second knuckle part 15 which is provided with a recess 16 which cooperates with the recess 14 to define a generally cylindrical passage 25. The first knucke part 13 and second knuckle part 15 have passages 19 enabling the first knuckle 13 and second knuckle 15 to be securely clamped together by means of bolts. Located within the passage 25 defined by the recesses 14 and 16 is a coupling sleeve 18 which surrounds and is fixed to the handle bar 11. The handle bar 11 is provided with holes 20 which receive pins 21 which also pass through holes 22 in the sleeve 18 to thereby secure the sleeve 18 to the handle bar 11. The sleeve 18 is also provided with a plurality of teeth-like projections 23 which engage teeth-like projections or channels 24 of knuckle parts 13 and 15 to thereby prevent rotation of the sleeve 18 and therefor handle bar 11 about the longitudinal axis of the handle bar 11.

It should be appreciated that the sleeve 18 could be injection moulded from plastics material or formed of metal having sufficient strength to securely engage the projections 24. Additionally the sleeve 18 could be fixed to the handle bar 11 by an adhesive rather than pins 21.

Figure 4:
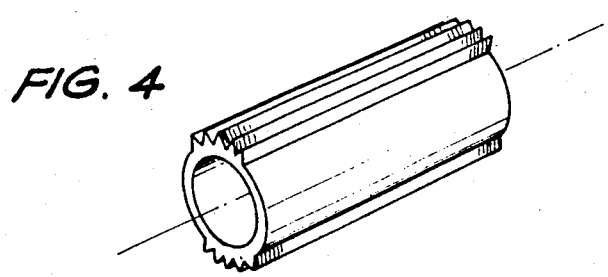
FIG. 4 is a schematic perspective view of an alternative sleeve to that depicted in FIG. 3.
Figure 5:
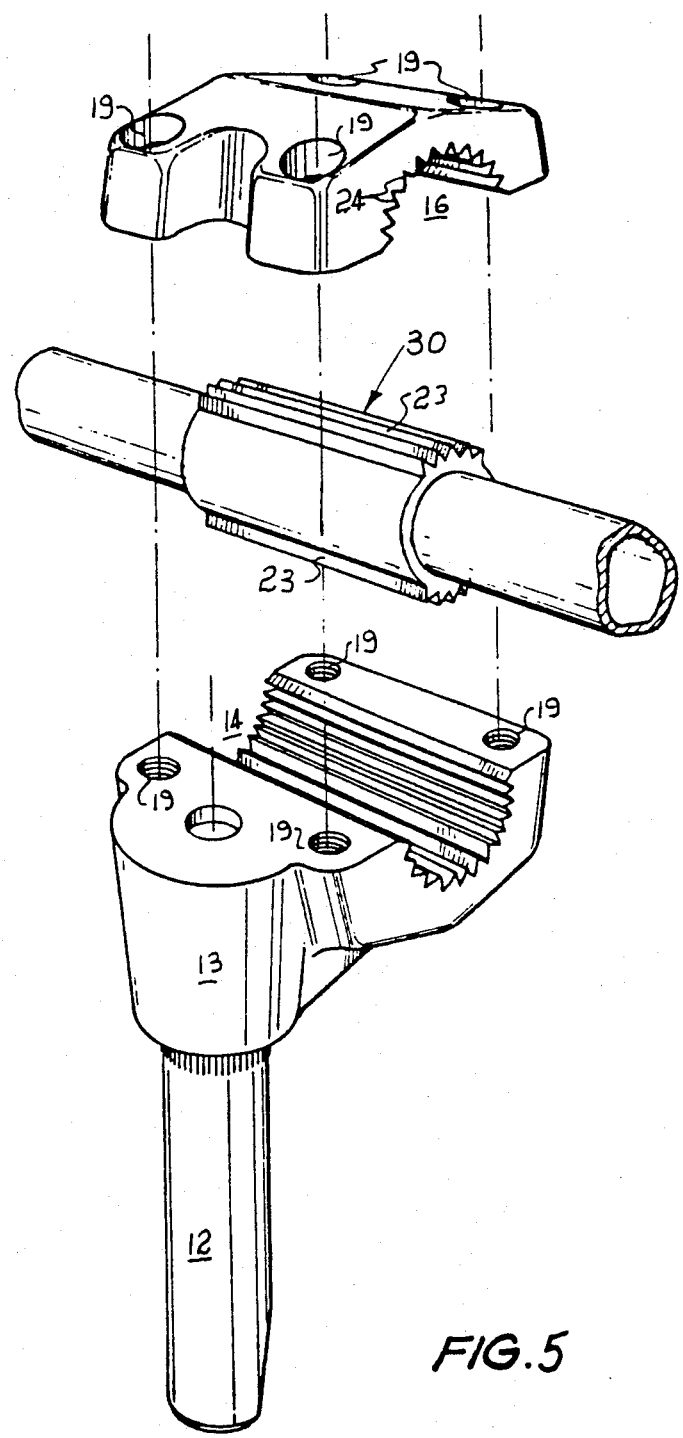
FIG. 5 is a schematic parts exploded perspective view of a further knuckle joint assembly to that of FIG. 1 employing the sleeve of FIG. 4.

Turning now to FIGS. 4 and 5 wherein a further embodiment of the present invention is illustrated. The knuckle assembly of FIG. 5 has been allocated the same reference numerals as the knuckle assembly of FIGS. 1, 2 and 3 as the majority of the components thereof are identical to the embodiment of FIGS. 1, 2 and 3. However, the knuckle assembly of FIG. 5 is provided with a coupling sleeve 30 which is formed of plastics material and is moulded to the handle bar 11 to thereby prevent rotation of the sleeve 30 about the handle bar 11. This particular embodiment has proven most advantageous as a good bond is formed between the sleeve 30 and the handle bar when the sleeve 30 is moulded about the handle bar 11.

Figure 6:
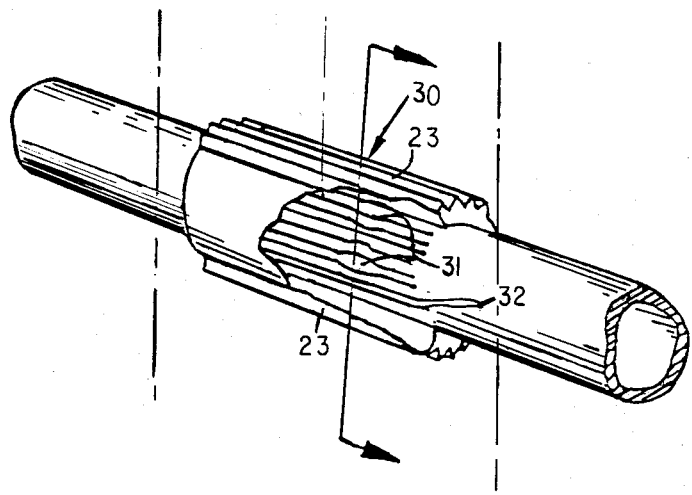
FIG. 6 illustrates a perspective view of the handle bar deformations according to the present invention.
Figure 7:
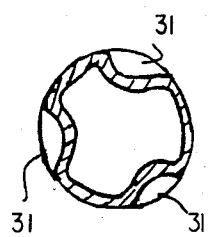
FIG. 7 illustrates a cross-sectional view along the line A in FIG. 6.

To enhance the bond between the handle bar 11 and sleeve 30, it has been found advantageous to serrate the surface of the handle bar 11 and/or provide indentations into which the plastic material of the sleeve 30 will flow. This is best seen in FIGS. 6 and 7 wherein indentations 31 and serrations 32 are shown.

In a further method of attaching the sleeve 30 to the handle bar 11, the sleeve 30 may be preformed and shrunk onto the bar 11, or deformed by heat and pressed onto the bar 11.

What I claim is:

1. A combination handle bar assembly for a velocipede and a knuckle joint for securing a handle bar of said assembly to a steering shaft of the velocipede, said assembly comprising a tubular handle bar having a generally longitudinally extending central portion with surface deformations, said deformations extending inwardly of the handle bar, said combination further comprising:
  a. a connection sleeve extending longitudinally around said handle bar so as to surround said central portion, said sleeve being formed of plastic material molded about said handle bar so as to extend into said deformations and so as to comprise means for preventing rotation of the sleeve about the handle bar, said sleeve having longitudinally extending ribs which extend generally radially relative to said handle bar;
  b. a first knuckle part to be fixed to said steering shaft, said first knuckle part having a recess;
  c. a second knuckle part having a recess, said second knuckle part being adapted to be fixed to said first knuckle part so that the recesses of said knuckle parts cooperate to provide a passage within which said handle bar and said sleeve are located, at least one of said knuckle parts having a plurality of longitudinally extending channels which receive said ribs to prevent rotation of said sleeve, and said handle bar fixed thereto, about the longitudinal axes of said sleeve and said handle bar relative to said knuckle parts; and
  d. means for clamping said knuckle parts together so that said handle bar and said sleeve are clampingly fixed between said knuckle parts.

2. The combination of claim 1 wherein said sleeve ribs and said knuckle part channels are adjustably arranged to allow for rotational adjustement of said handle bar relative to said knuckle parts.

3. The combination of claim 1 wherein said central portion of said handle bar is serrated to securely engage said sleeve on said central portion.

4. The combination according to claim 1 wherein said plurality of longitudinally extending channels and said plurality of ribs are v-shaped.

5. The combination of claim 1 wherein said sleeve comprises:
  a. two portions having a plurality of ribs; and
  b. two ribless portions wherein said two ribbed portions and said two ribless portions are alternately placed on said sleeve.

6. The combination of claim 1 wherein said surface deformations extend longitudinally along said central portion of said handle bar.

7. The combination of claim 5 wherein the two ribbed portions and the two ribless portions extend longitudinally along the length of the sleeve so that the ribbed portions alternate with the ribless portions along the longitudinal axis of the sleeve.

* * * * *